United States Patent Office 2,971,921
Patented Feb. 14, 1961

2,971,921

MANGANESE COMPLEXES OF NITROSOPHENOLS AS INFRARED ABSORBERS

Ralph A. Coleman, Middlesex, and John L. Rodgers, Somerville, N.J., assignors to American Cyanamid Company, New York, N.Y., a corporation of Maine No Drawing. Filed Jan. 26, 1959, Ser. No. 788,737

5 Claims. (Cl. 252—300)

This invention relates to a method of increasing the infrared absorption of materials and of projecting materials from incident infrared rays by interposing a barrier containing an infrared absorber between the source of said rays and the material to be protected. Further, it relates to a method of increasing the infrared absorption of materials by incorporating therein the manganese complexes of certain o-nitrosohydroxy compounds.

The radiant energy from the sun can be divided into three regions, the near-ultraviolet, the visible and the near-infrared. Together these three regions cover the range of wavelengths from 0.290 micron to about 4.0 microns. Somewhat arbitrarily, the near-ultraviolet spectrum may be considered to cover the region of 0.300–0.400 micron; the visible spectrum, the region of 0.400–0.700 micron; and the near-infrared spectrum the region of 0.700–5.0 microns.

The heat from the sun is essentially due to the near-infrared radiant energy. Other high temperature bodies, such as tungsten filaments, fluorescent lamps, carbon arcs, etc., also radiate energy in the near-infrared region. Glass absorbs radiations of wavelength greater than 5.0 microns.

For practical purposes, the near-infrared spectrum may be defined as falling between 0.7 and 5.0 microns, as this is the area where the common sources of infrared radiation emit substantially all of their infrared energy. Over half of the total radiation energy emitted by the sun or electrical lamps lies in the near-infrared region.

TABLE I

*Approximate distribution of radiant energy from several energy sources*

| | Percent of Total Radiant Energy Emitted | | | |
|---|---|---|---|---|
| | .3–.4μ | .4–.7μ | .6–1.6μ | Above .7μ |
| Sunlight (reaching earth) | 5 | 42 | 54 | 53 |
| Tungsten Lamp, 500 W. | 0.1 | 10 | 53 | 90 |
| Fluorescent Lamp | 5 | 35 | 28 | 60 |
| Carbon Filament Heater | | 1 | 28 | 71 |
| Nonluminous Heater | 0 | 1.5 | 1.3 | 97 |

TABLE II

*Approximate distribution of radiant energy of sunlight*

| Region | Percent of Total | Percent of Infrared |
|---|---|---|
| 0.3–0.4μ | 5 | |
| 0.4–0.7μ | 42 | |
| 0.7–1.0μ | 23 | 43.5 |
| 1.0–1.3μ | 12 | 22.5 |
| 1.3–1.6μ | 4.5 | 8.5 |
| 1.6–1.9μ | 4.5 | 8.5 |
| 1.9–2.7μ | 5 | 9.5 |
| 2.7–upμ | 4 | 7.5 |

From the above tables it may be seen that within the near-infrared region, the greatest amount of infrared energy is radiated close to the visible spectrum; i.e., 0.7 to 2.0 microns. For sunlight, ⅔ of the infrared energy comes between 0.7 and 1.3 microns. Thus, it may be seen that a large proportion of the energy transmitted by our common light sources serves no useful purpose with respect to illumination, but contributes to the development of heat in the material receiving the radiation.

In many circumstances it will be desirable to filter out the nonvisible radiations of the near-infrared region of the spectrum without materially diminishing the visible radiations. There are many potential applications for materials that will transmit visible radiations and, at the same time, be opaque to heat-producing infrared radiation, partially in the near-infrared region of 0.7–1.3 microns. Among such possible applications may be mentioned windows, sun glasses, welders' goggles and other eye protective lenses, television filters, projection lenses, etc.

One major potential application of infrared absorbers is in plastics. Many plastics absorb large amounts of radiation above 2.5 or 3.0 microns, but this is not the region of the spectrum where there is the greatest need for infrared absorbing materials. With glasses, the best and usual additive is found to be ferrous oxide, although other metal oxides have been used. With an organic compound, however, such materials are unuseable. An organic compound, such as plastic, needs material which has other properties, the most important of which is compatability. The infrared absorber for a plastic must be colorless and stable and should absorb strongly in the near-infrared in addition.

Another use in which there is a need for materials which will absorb infrared light is in those cases in which it is desirable to increase the infrared absorption of a material. One such situation is in the case of inks. It has become quite common to use infrared sensitive paper to copy written and typewritten documents in order to save valuable secretarial time. This use is carried out by exposing the document to be copied, in juxtaposition to infrared sensitive paper, to infrared light. At the point where the printing or writing occurs on the paper, an increase in infrared absorption causes the reproduction of the writing on the infrared sensitive paper. However, it has been found that the average ink using synthetic dyes does not reproduce well in this process. Only those inks which are based on carbon black have been found readily reproducible. There is thus a need for a material which may be incorporated in the ordinary ink which will increase the infrared absorption and thus permit the easy copying by infrared sensitive paper of documents written with such ink.

We have found that the manganous complexes of certain o-nitrosophenols, listed below, have the property of absorbing infrared light in the proper range and dispersing the absorbed energy in the far-infrared, and that the use of these manganous complexes to protect other materials from deterioration by infrared light and the use of them to increase the infrared absorption of materials containing them are especially advantageous.

The nitrosophenols whose manganous complexes are useable in the compositions of our invention are 5-dimethylamino-2-nitrosophenol, 5-diethylamino-2-nitrosophenol, 5-ethylmethylamino-2-nitrosophenol, 5-dipropylamino-2-nitrosophenol, 5-dibutylamino-2-nitrosophenol, 4-methyl-2-nitrosophenol, 5-methoxy-2-nitrosophenol, 5-acetamino-2-nitrosophenol, 1-nitroso-2-naphthol, 1-nitroso-2-naphthol-6-sulfonamide and 1-methyl-7-isopropyl-10-nitroso-9-phenanthrol. It is most surprising that these manganous complexes show this absorption in the proper range in the near-infrared. None of the following closely related compounds can be similarly used in the form of the manganous complexes.

4-nitrosoresorcinol
4,6-dinitrosoresorcinol
N-methyl-1-nitroso-2-naphthylamine
2-nitroso-1-naphthol
2-nitroso-1-naphthol-4,8-disulfonic acid
2-nitroso-1-naphthol-4-sulfonamide
4-chloro-2-nitrosophenol
3,4-dichloro-1-nitroso-2-naphthol
2-nitroso-1-naphthol-4-sulfonic acid
1-nitroso-2-naphthol-3,6-disulfonic acid
1-nitroso-2-hydroxy-3-naphthanilide There does not seen to be any specific structural characteristic which distinguishes the o-nitrosohydroxy compounds which absorb properly in the near-infrared from those whose manganous complexes are useable as infrared absorbers.

In the use of a compound to be interposed between the source of infrared light and a material to protect the latter from that light, one may use a barrier consisting of any organic solid material in which the manganous complex of the nitrosohydroxy compound is compatible. Such materials include any of the translucent plastic materials. The material usually will be translucent to visible light since usually, coincident with protection from the infrared light, it is also desirable that visible light pass through to the material being protected. This, however, is not always necessary since it is sometimes desirable to protect a material which is sensitive to infrared and still have no desire to let visible light fall upon it. In such a case, the barrier may be opaque to visible light. Usually, however, the barrier will be translucent to visible light.

As barriers, one may especially mention the various plastic materials such as the cellulose esters, including cellulose nitrate, cellulose acetate and the like; regenerated cellulose, cellulose ethers as for example, ethyl and methyl cellulose; the polystyrene plastics, such as polystyrene itself, polymers of ring substituted styrenes for example, o-, m-, and p-methylstyrene; vinyl polymers, such as polyvinyl butyral and other acetals, polyvinyl chloride, polyvinyl acetate and its hydrolysis products, polyvinyl chloride-acetate copolymer and the like; the acrylic resins, such as, polymers and copolymers of methyl acrylate, acrylamide, methylolacrylamide, acrylonitrile and the like; the polyolefins such as polyethylene, polypropylene and the like; polyesters and unsaturated-modified polyester resins made by the condensation of polycarboxylic acids with polyhydric phenols, modified by using unsaturated carboxylic acids and further modified by reacting the alkyd with a monomeric polymerizable vinylidine compound such as styrene and side chain substituted styrenes such as alpha-methylstyrene and ethylstyrene and the like, or ring substituted styrenes. Also, the cross-linking monomer can be an allyl ester of various acids.

In addition to the various plastics, the carrier may be any one of a number of waxes, both natural and synthetic or of the various other thermosetting and thermoplastic opaque resins which may be used in varnishes and paints as well as in other coating materials.

In addition to the above uses and barriers, the manganous complexes of these o-nitrosohydroxy compounds may be incorporated in any organic material in which it is desirable to increase the infrared absorption. They also may be incorporated in aqueous and non-aqueous suspensions and solutions of coloring materials such as is used for inks, both of the normal type and of those used in ball point pens or in any other material in which it is desirable to increase the infrared absorption.

The usage of the manganous complex of the o-nitrosohydroxy compounds should be at least 0.01 gram per square foot of a barrier or of 0.01% by weight when the material is incorporated in another material to increase the infrared absorption. In incorporation in a barrier, the actual concentration of the manganous complex will decrease with an increase in the thickness of the barrier to give the same protection, since the total weight of manganous complex per unit area of the barrier will remain the same.

Our invention can be illustrated by the following examples in which parts are by weight unless otherwise specified and parts by volume represent the volume occupied by one part of water.

EXAMPLE 1

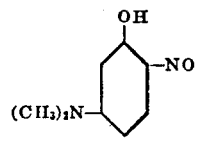

A solution of the manganous complex of 5-dimethylamino-2-nitrosophenol is prepared by mixing 10 parts by volume of the 0.001 M solution obtained by dissolving 0.152 part of 5-dimethylamino-2-nitrosophenol in 1,000 parts by volume of dimethylformamide with 5 parts by volume of a 0.001 M solution of manganous chloride and 10 parts by volume of a 0.001 M solution of cyclohexylamine, both in dimethylformamide. The whole is then diluted to 100 parts by volume with dimethylformamide. After formation of the manganous complex, the originally deep red solution assumes a greenish color.

EXAMPLE 2

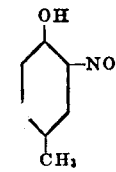

A solution of the manganous complex of 4-methyl-2-nitrosophenol is prepared by mixing 10 parts by volume of the 0.001 M solution obtained by dissolving 0.0686 part of 4-methyl-2-nitrosophenol in 500 parts by volume of dimethylformamide with 5 parts by volume of a 0.001 M solution of manganous chloride and 10 parts by volume of a 0.001 M solution of cyclohexylamine, both in dimethylformamide. The whole is then diluted to 100 parts by volume with dimethylformamide. The original red-brown color becomes brown.

EXAMPLE 3

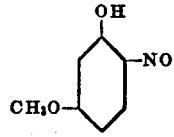

A solution of the manganous complex of 5-methoxy-2-nitrosophenol is prepared by mixing 10 parts by volume of the 0.01 M solution obtained by dissolving 0.153 part of 5-methoxy-2-nitrosophenol in 100 parts by volume of dimethylformamide with 1 part by volume of the solution obtained by dissolving 1.145 parts of manganous chloride tetrahydrate in 100 parts by volume of dimethylformamide. This solution has a light green color.

EXAMPLE 4

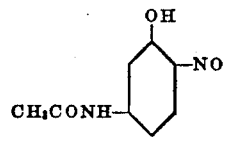

A solution of the manganous complex of 5-acetamido-2-nitrosophenol is prepared by mixing 10 parts by volume of the 0.001 M solution obtained by dissolving 0.0906 part of 5-acetamino-2-nitrosophenol in 500 parts of dimethylformamide with 5 parts by volume of a 0.001 M solution of manganous chloride and 10 parts by volume of a 0.001 M solution of triethylamine, both in dimethylformamide. The whole is then diluted to 100 parts by volume with dimethylformamide, giving a greenish-yellow solution.

EXAMPLE 5

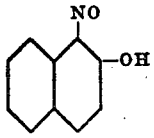

A solution of the manganous complex of 1-nitroso-2-naphthol is prepared by mixing 10 parts by volume of 0.001 M solution of 1-nitroso-2-naphthol, 5 parts by volume of 0.001 M solution of manganous chloride and 10 parts by volume of 0.001 M solution of cyclohexylamine, all in dimethylformamide. The solution is diluted to 100 parts by volume with dimethylformamide.

EXAMPLE 6

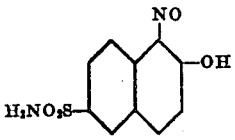

A solution of the manganous complex of 1-nitroso-2-naphthol-6-sulfonamide is prepared by mixing 10 parts by volume of the 0.001 M solution obtained by dissolving 0.1261 part of 1-nitroso-2-naphthol-6-sulfonamide in 500 parts by volume of dimethylformamide with 5 parts by volume of a 0.001 M solution of manganous chloride and 10 parts by volume of a 0.001 M solution of cyclohexylamine, both in dimethylformamide. The whole is diluted to 100 parts by volume with dimethylformamide, giving a yellow-green solution.

EXAMPLE 7

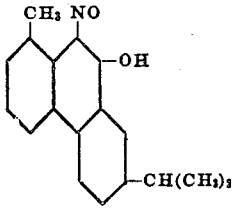

A solution of the manganous complex of the monooxime of retenequinone is prepared by mixing 10 parts by volume of the 0.001 M solution obtained by dissolving 0.1357 part of the monooxime of retenequinone in 500 parts by volume of dimethylformamide with 5 parts by volume of a 0.001 M solution of manganous chloride and 10 parts by volume of a 0.001 M solution of cyclohexylamine, both in dimethylformamide. This solution is diluted to 100 parts by volume with dimethylformamide, giving a yellow solution.

EXAMPLE 8

The spectral curves of the solutions of the manganous complexes of Examples 1–7 is determined in the visual and near-infrared regions of 350 to 2,000 millimicrons (mμ), or 0.350 to 2.00 microns. For this purpose, a Spectracord, a recording spectrophotometer fitted with a near-infrared attachment and a tungsten light source, is used. The wavelength of maximum absorption ($\lambda_{max}$) is determined from the curve. The specific absorption coefficient at the wavelength of the maximum absorption, designated $a_{max}$, is an expression of the degree of absorption and is calculated using the following relationship:

$$a_{max} = \frac{1}{bc} \log \frac{T}{T_0}$$

where $a$ is the absorption coefficient
$b$ is the thickness of the cell (spectrophotometer) in cm.
$c$ is the concentration in grams per liter
$T$ is the amount of light passing through the solution
$T_0$ is the amount of light passing through the solvent in the same cell.

The results are given in Table III

TABLE III

| Manganous Complex | Near Infrared | | Visible | |
|---|---|---|---|---|
| | $\lambda_{max}$ | $a_{max}$ | $\lambda_{max}$ | $a_{max}$ |
| | Mμ | | Mμ | |
| Example 1 | 842 | 13.5 | 449 | 63.3 |
| Example 2 | 825 | 4.0 | ¹ 450 | 16.0 |
| Example 3 | 820 | 3.0 | (²) | ---- |
| Example 4 | 840 | 1.3 | ¹ 450 | 7.4 |
| Example 5 | 820 | 6.5 | 415 | 16.2 |
| Example 6 | 818 | 3.2 | ¹ 450 | 7.7 |
| Example 7 | 790 | 0.7 | ¹ 450 | 8.0 |

¹ Not maximum, peak below 400 mμ.
² Less than 2% transmission from 470 mμ to 320 mμ.

EXAMPLE 9

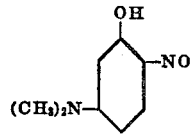

A suspension of 13.3 parts (0.08 mole) of 5-dimethylamino-2-nitrosophenol in 300 parts of water is heated on the steam bath and concentrated hydrochloric acid is added until all the nitrosophenol is dissolved. To this solution there is added 7.92 parts (0.04 mole) of manganous chloride tetrahydrate dissolved in 50 parts of water, and the resultant solution is neutralized with solid sodium acetate until the mixture has a pH of about 6.5. After heating on the steam bath for a short time, the dark brown product which has separated, is filtered off, washed three times with water and twice with acetone, and dried.

Similar products are obtained by substituting equivalent amounts of 5-diethylamino-2-nitrosophenol, 5-ethylmethylamino-2-nitrosophenol, 5-dipropylamino-2-nitrosophenol or 5-dibutylamino-2-nitrosophenol for the 5-dimethylamino-2-nitrosophenol.

EXAMPLE 10

Five parts by volume of the solution obtained by dissolving 0.0399 part of the isolated manganous complex of 5-dimethylamino-2-nitrosophenol (Example 9) in 100 parts by volume of dimethylformamide is diluted to 100 parts by volume with dimethylformamide. Assuming a combining ratio of mangagese to ligand of 1:2, this is a 0.00005 molar solution. The spectral curve of this solution has the same shape as the curve of the solution of the nonisolated complex of Example 1.

| | Isolated complex | Nonisolated complex |
|---|---|---|
| $\lambda_{max}$ mμ | 840 | 840 |
| $a_{max}$ | 10.8 | 13.5 |

Similar results are obtained by substituting equivalent amounts of the manganous complexes of 5-diethylamino-2-nitrosophenol, 5-ethylmethylamino-2-nitrosophenol, 5-dipropylamino-2-nitrosophenol or 5-dibutylamino-2-nitrosophenol for the manganous complex of 5-dimethyl-amino-2-nitrosophenol.

EXAMPLE 11

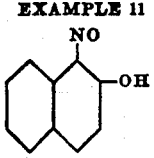

To a suspension of 13.8 parts (0.08 mole) of 1-nitro-2-naphthol in 300 parts of water there is added 120 parts of sodium acetate trihydrate and the mixture is heated with stirring to just below the boiling point. To the resulting hot suspension there is added 7.92 parts (0.04 mole) of manganous chloride tetrahydrate dissolved in 50 parts of water and the mixture is heated with stirring on the steam bath for one hour. The dark product which has separated is then filtered off, washed three times with water and three times with ether, and dried.

A sample (0.0399 part) of the isolated manganous complex is dissolved in 100 parts by volume of dimethylformamide, and 5 parts by volume of this is diluted to 100 parts by volume with dimethylformamide. Assuming a combining ratio of manganese to ligand of 1:2, the final solution is 0.00005 molar. The spectral curve of this solution in the visible and near-infrared region is determined.

|  | Isolated Complex | Nonisolated Complex (Example 5) |
|---|---|---|
| $\lambda_{max}$-------------m$\mu$-- | 840 | 820 |
| $a_{max}$------------------------ | 16.4 | 6.5 |

EXAMPLE 12

There is milled into 50 parts of said cellulose acetate 0.001 part of the isolated manganous complex of 5-methylamino-2-nitrosophenol. A plastic chip, 15 mls. in thickness is molded. This molded material shows an absorption peak of 820 millicrons.

EXAMPLE 13

The procedure of Example 12 is followed using polyvinyl chloride instead of cellulose acetate.

EXAMPLE 14

The procedure of Example 12 is followed using polystyrene in place of the cellulose acetate.

EXAMPLE 15

The procedure of Example 12 is followed using polyethylene in place of the cellulose acetate.

EXAMPLE 16

The product of Example 9 is dispersed in an equal weight of mineral oil. This, on use as an ink, reproduces well when a heat sensitive reproduction paper is placed in contact with a paper bearing writing in the above ink and exposed to infrared light.

We claim:

1. A method of increasing the infrared absorption of materials which comprises incorporating therein at least 0.01% by weight of the manganous complex of an o-nitrosohydroxy compound selected from the group consisting of 5-di-lower alkylamino-2-nitrosophenol, 4-methyl-2-nitrosophenol, 5-methoxy-2-nitrosophenol, 5-acetamino-2-nitrosophenol, 1-nitroso-2-naphthol, 1-nitroso-2-naphthol-6-sulfonamide and 1-methyl-7-isopropyl-10-nitroso-9-phenanthrol.

2. A method of protecting materials from incident infrared rays which comprises interposing between the source of said infrared rays and the material to be protected, a barrier containing at least 0.01 gram per square foot of barrier of the manganous complex of an o-nitrosohydroxy compound selected from the group consisting of 5-di-lower alkylamino-2-nitrosophenol, 4-methyl-2-nitrosophenol, 5-methoxy-2-nitrosophenol, 5-acetamino-2-nitrosophenol, 1-nitroso-2-naphthol, 1-nitroso-2-naphthol-6-sulfonamide and 1-methyl-7-isopropyl-10-nitroso-9-phenanthrol.

3. The method of claim 1 in which the nitrosohydroxy compound is 5-dimethylamino-2-nitrosophenol.

4. The method of claim 2 in which the said barrier is an organic polymeric material.

5. The method of claim 2 in which the nitrosohydroxy compound is 5-dimethylamino-2-nitrosophenol.

References Cited in the file of this patent
UNITED STATES PATENTS

| 2,813,802 | Ingle | Nov. 19, 1957 |
| 2,895,955 | Heseltine | July 21, 1959 |